US010563812B2

(12) United States Patent
Chen et al.

(10) Patent No.: US 10,563,812 B2
(45) Date of Patent: Feb. 18, 2020

(54) FOLDABLE SUPPORTING DEVICE

(71) Applicant: SYNCMOLD ENTERPRISE CORP., New Taipei (TW)

(72) Inventors: Kuang-Po Chen, New Taipei (TW); Wen-Chen Liu, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 0 days.

(21) Appl. No.: 16/131,254

(22) Filed: Sep. 14, 2018

(65) Prior Publication Data

US 2020/0003360 A1    Jan. 2, 2020

(30) Foreign Application Priority Data

Jun. 28, 2018    (TW) .............................. 107208728 U (51) Int. Cl.
| | | |
|---|---|---|
| *F16M 11/00* | (2006.01) | |
| *F16M 11/38* | (2006.01) | |
| *F16M 11/04* | (2006.01) | |
| *F16B 1/00* | (2006.01) | |

(52) U.S. Cl.
CPC .............. *F16M 11/38* (2013.01); *F16B 1/00* (2013.01); *F16M 11/041* (2013.01); *F16B 2001/0035* (2013.01)

(58) Field of Classification Search
CPC ......... A47B 97/04; A47B 97/08; A47B 23/04; A47B 23/044
USPC ..... 248/441.1, 447, 448, 449, 459, 460, 463
See application file for complete search history.

(56) References Cited

U.S. PATENT DOCUMENTS

| | | | | |
|---|---|---|---|---|
| D670,703 | S | * | 11/2012 | Hasbrook .................... D14/447 |
| D703,659 | S | * | 4/2014 | Werth .......................... D14/253 |
| D703,676 | S | * | 4/2014 | Smith .......................... D14/447 |
| 8,727,295 | B2 | * | 5/2014 | Peng ...................... F16M 13/00 |
| | | | | 248/346.01 |
| 9,364,081 | B1 | * | 6/2016 | Haymond ............ A47B 23/044 |
| D829,725 | S | * | 10/2018 | Luo .............................. D14/447 |
| D839,869 | S | * | 2/2019 | Wang .......................... D14/253 |
| 2010/0090085 | A1 | * | 4/2010 | Corrion ................ A47B 23/043 |
| | | | | 248/459 |

* cited by examiner

*Primary Examiner* — Steven M Marsh
(74) *Attorney, Agent, or Firm* — Muncy, Geissler, Olds & Lowe, P.C.

(57) ABSTRACT

A foldable supporting device for supporting a display is provided. The foldable supporting device comprises a first plate, a second plate, a rotating module, and a supporting element. The first plate and the second plate are able to transform between a folding position and a supporting position by using the rotating module, and the supporting element is able to accept the display.

9 Claims, 7 Drawing Sheets

FOLDABLE SUPPORTING DEVICE

CROSS REFERENCE TO RELATED APPLICATION

This application claims the benefits of the Taiwan Patent Application Serial Number 107208728, filed on Jun. 28, 2018, the subject matter of which is incorporated herein by reference.

BACKGROUND OF THE INVENTION

1. Field of the Invention

The present invention relates to a foldable supporting device, more specifically to a foldable supporting device for supporting a flat panel display.

2. Description of Related Art

Tablet computers with touchscreens are becoming more and more popular because they are portable and easy for operation. Using a supporting frame to maintain a tablet computer at a better operating angle is a popular operating mode for users. However, most of the supporting frames in the market are bulky and are not convenient for a user to carry.

SUMMARY OF THE INVENTION

In order to solve the above problems, the foldable supporting device is provided in the present invention to simply transform between a folding position and a supporting position. When the foldable supporting device is at the folding position, its volume is small for being easy to carry and store. When the foldable supporting device is at the supporting position, it provides a stable and firm supporting force for the display, and can prevent the display from undesired displacement during operation.

The foldable supporting device of the present invention comprises: a first plate, including a first contact end and a free end; a second plate, including a second contact end, which contacts with the first contact end; a rotating module, disposed between the first contact end and the second contact end for the first plate and the second plate being rotating with respect to each other; and a supporting element, including a bending portion and being disposed on the first plate for accepting the display. The first plate and the second plate are able to transform between a folding position and a supporting position. The first plate and the second plate form a first angle at the folding position, and form a second angle at the supporting position, wherein the first angle is larger than the second angle.

In a preferred embodiment, the first contact end has a first surface and a first groove, and the second contact end has a second surface and a second groove, wherein the first surface and the second surface contact with each other at both the folding position and the supporting position, and the rotating module is disposed in the first groove and the second groove.

In a preferred embodiment, the first angle is substantially 180 degrees, and the second angle is from 15 degrees to 75 degrees.

In a preferred embodiment, the rotating module has a first sheet, a second sheet, and a rotating shaft, wherein the first sheet is disposed in the first groove, the second sheet is disposed in the second groove, and the rotating shaft passes through the first sheet and the second sheet so that the first sheet and the second sheet are able to rotate with respect to each other.

In a preferred embodiment, the rotating shaft has an axis being perpendicular to the first surface and the second surface.

In a preferred embodiment, the supporting element further comprises a pivot shaft and a supporting plate. The pivot shaft is pivotally connected to the free end. The supporting plate is connected to the pivot shaft. The bending portion is formed at one end of the supporting plate for accepting the display.

In a preferred embodiment, the supporting element has at least one magnet, and the display is correspondingly disposed with at least one magnet. When the display is placed on the supporting element, the magnets fix the display to the supporting element in a specific position.

In a preferred embodiment, the foldable supporting device further comprises a limiting module disposed at the first contact end or the second contact end. The limiting module restricts the first plate and the second plate in positions when the first plate and the second plate are at the folding position or the supporting position.

In a preferred embodiment, the limiting module comprises two first limiting elements and two second limiting elements. The first contact end further comprises two first accommodating grooves, and the second contact end further comprises two second accommodating grooves. The first limiting elements are disposed in the first accommodating grooves, and the second limiting elements are disposed in the second accommodating grooves. The first limiting elements and the second limiting elements correspondingly lock with each other when the first plate and the second plate are at the folding position or the supporting position.

In a preferred embodiment, the first limiting elements and the second limiting elements are made of magnetic material, and the first limiting elements and the second limiting elements are magnetically attracted to each other.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape, and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
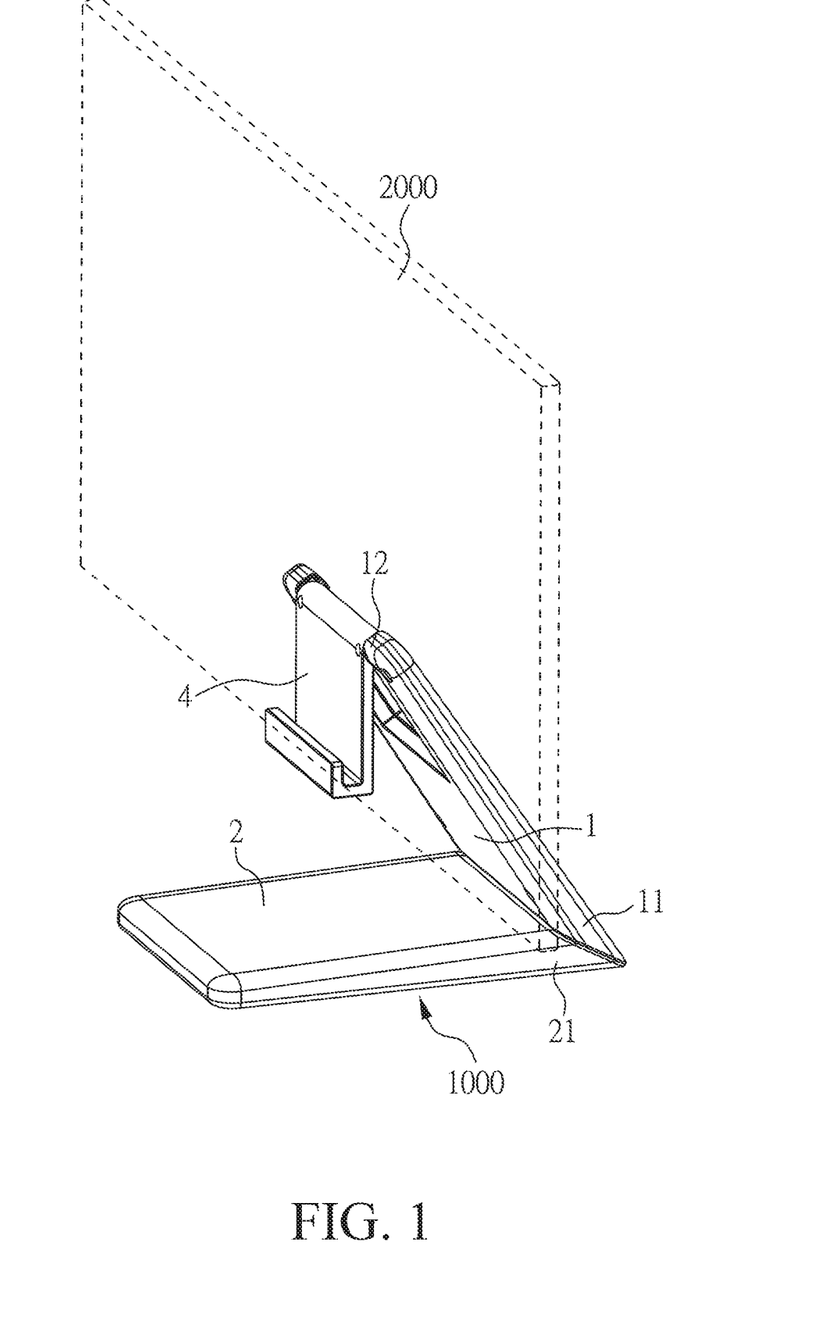
FIG. 1 is a perspective view of the foldable supporting device of the present invention.
Figure 2:
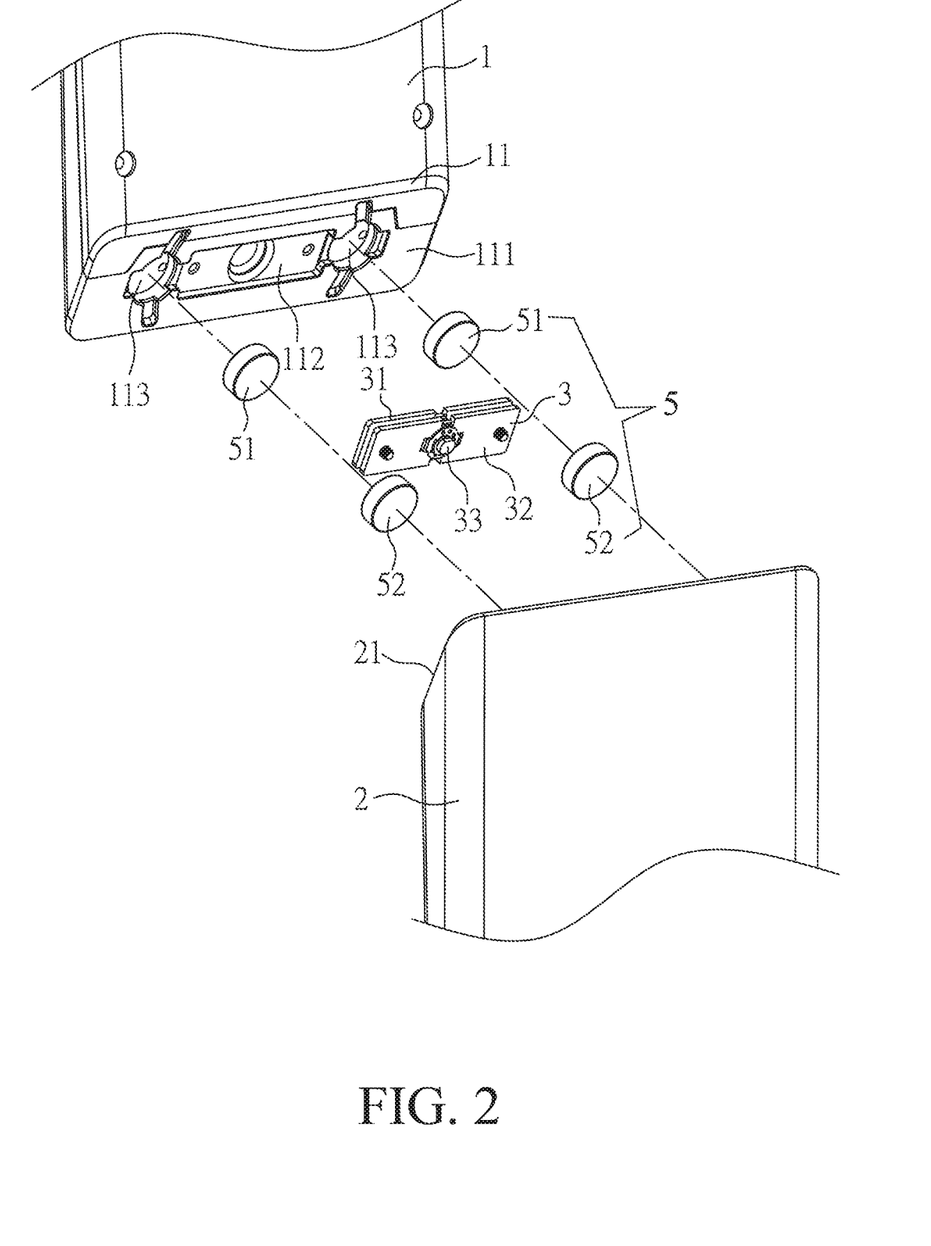
FIG. 2 is a partial exploded view of the foldable supporting device of the present invention.

Please refer to FIG. 1 and FIG. 2, a foldable supporting device 1000 is used for supporting a display 2000 on a working surface (not shown). The foldable supporting device 1000 mainly comprises a first plate 1, a second plate 2, a rotating module 3, a supporting element 4, and a limiting module 5. The limiting module 5 includes two first limiting elements 51 and two second limiting elements 52. The first plate 1 and the second plate 2 are able to transform between a folding position and a supporting position.

Referring to the partial exploded view of FIG. 2, the first plate 1 includes a first contact end 11 and a free end 12 (please refer to FIG. 1), wherein the first contact end 11 has a first surface 111, a first groove 112, and two first accommodating grooves 113. The first groove 112 and the first accommodating grooves 113 are formed from the first surface 111. The center point of the first groove 112 is aligned with the center point of the first surface 111, and the first accommodating grooves 113 are formed on both sides of the first groove 112 respectively. The first groove 112 is able to accommodate a portion of the rotating module 3, and the first accommodating grooves 113 are able to accommodate the first limiting elements 51. In addition, the free end 12 has two receiving recesses 121 (please refer to FIG. 4) for assembling with the supporting element 4.

Figure 3:
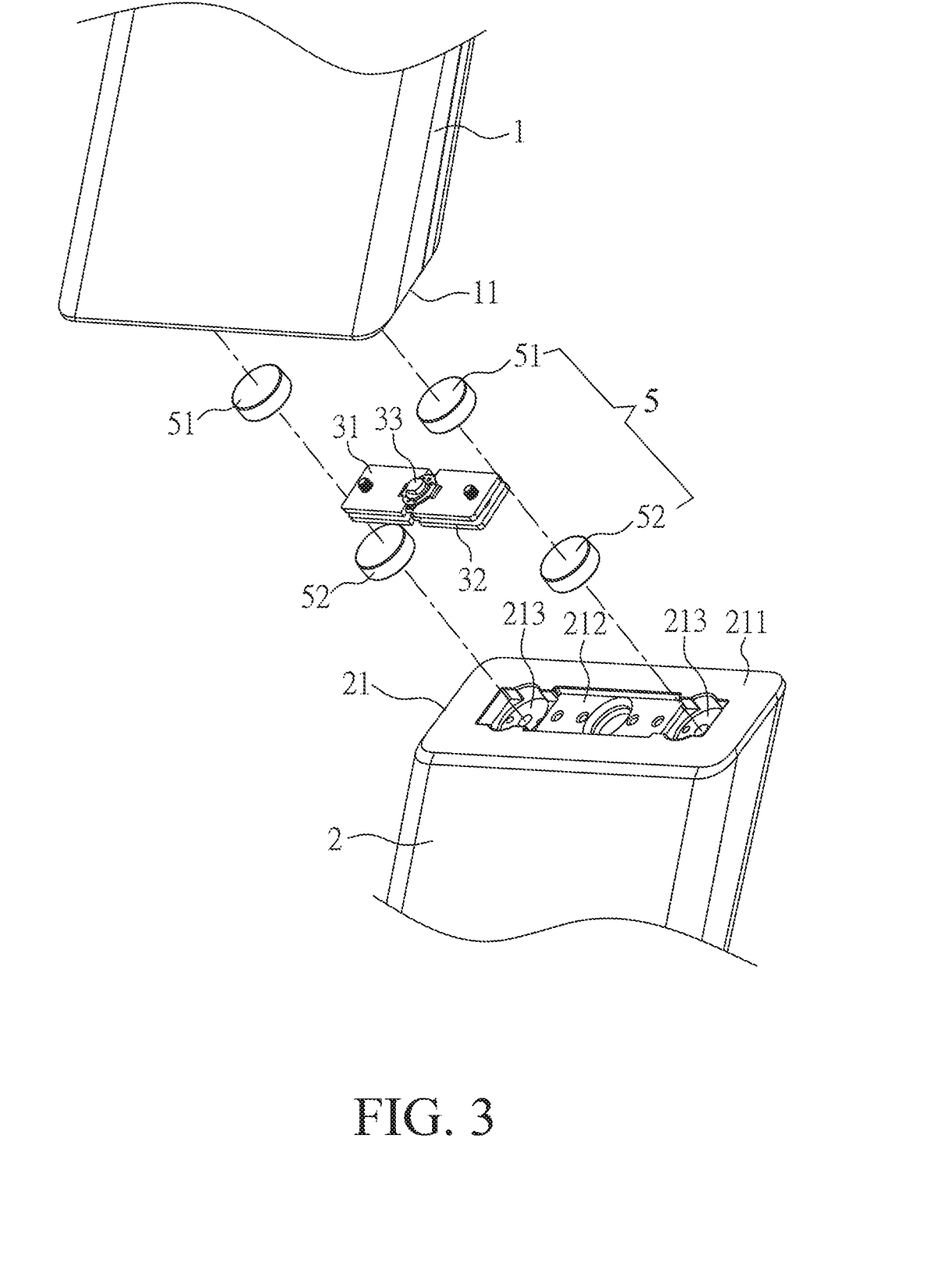
FIG. 3 is another partial exploded view of the foldable supporting device of the present invention.

Please also refer to the partial exploded view shown in FIG. 3, the second plate 2 includes a second contact end 21, which contacts with the first contact end 11. The second contact end 21 has a second surface 211, a second groove 212, and two second accommodating grooves 213, wherein the second groove 212 and the second accommodating grooves 213 are formed from the second surface 211. Likewise, the center point of the second groove 212 is aligned with the center point of the second surface 211, and the second accommodating grooves 213 are formed on both sides of the second groove 212 respectively. The second groove 212 is able to accommodate a portion of the rotating module 3, and the second accommodating grooves 213 are able to accommodate the second limiting elements 52. The first plate 1 and the second plate 2 contact with each other by the first surface 111 and the second surface 211, and the first accommodating grooves 113 and the second accommodating grooves 213 correspond to each other when the first surface 111 and the second surface 211 are overlapped with each other (that is to say, at the folding position or the supporting position).

The rotating module 3 has a first sheet 31, a second sheet 32, and a rotating shaft 33. The first sheet 31 is fixedly disposed in the first groove 112, and the second sheet 32 is fixedly disposed in the second groove 212. The rotating shaft 33 passes through the first sheet 31 and the second sheet 32 so that the first sheet 31 and the second sheet 32 are able to rotate with respect to each other. In addition, the rotating shaft 33 is perpendicular to the first surface 111 of the first plate 1 and the second surface 211 of the second plate 2, and the axis of the rotating shaft 33 is aligned with the center points of the first surface 111 and the second surface 211. Therefore, the first plate 1 and the second plate 2 are able to rotate with respect to each other by the rotating shaft 33.

However, in other embodiments, the axis of the rotating shaft 33 is not necessarily aligned with the center points of the first surface 111 and the second surface 211, and able to be adjusted according to appearance or other requirements. When the rotating shaft 33 is not aligned with the center points of the first surface 111 and the second surface 211, the first surface 111 and the second surface 211 only partially overlap at the folding position or the supporting position.

Figure 4:
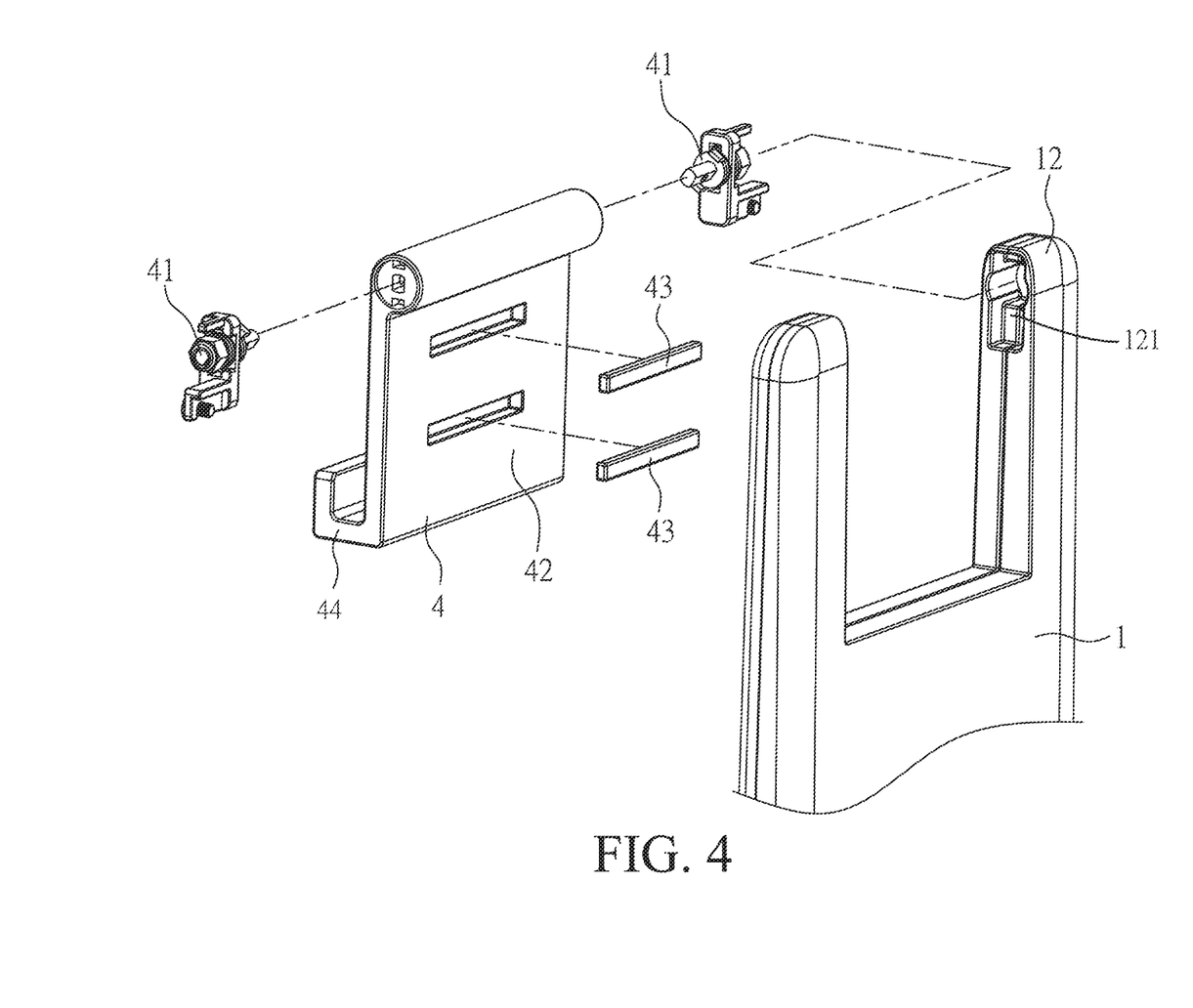
FIG. 4 is further another partial exploded view of the foldable supporting device of the present invention.

Please refer to the partial exploded view of FIG. 4, the supporting element 4 has two pivot shafts 41, a supporting plate 42, two magnets 43, and a bending portion 44. The pivot shafts 41 are accommodated in the receiving recesses 121 to be pivotally connected to the free end 12 of the first plate 1. The two sides of the supporting plate 42 are connected to one of the pivot shafts 41 respectively, and the supporting plate 42 is able to pivot with respect to the free end 12. When the first plate 1 and the second plate 2 are at the supporting position, an external force can be provided to pivot the supporting element 4 so that the supporting element 4 and the first plate 1 form an angle therebetween, and the view angle of the display 2000 disposed on the supporting element 4 is determined. Furthermore, the bending portion 44 is formed on an end of the supporting plate 42. The bending portion 44 has an L-shaped cross-section so that the display 2000 can be stably placed on the bending portion 44, and the magnets 43 can attract the corresponding magnetic substances disposed on the display 2000. For example, the magnetic substance can be a back plate of the display 2000 made of iron, or magnet members disposed on the back plate of the display 2000 corresponding to the magnets 43 to prevent the display 2000 from undesired displacement during operation.

However, in another embodiment, the pivot shaft 41 or the supporting plate 42 can be omitted, the supporting element 4 includes the magnets 43 and the bending portion 44, which are directly formed on one side of the first plate 1. The bending portion 44 is used for supporting the display 2000, and the magnets 43 attract the corresponding magnetic substances disposed on the display 2000 to prevent display 2000 from undesired displacement.

Please further refer to FIG. 2 and FIG. 3, the first limiting elements 51 and the second limiting elements 52 are magnetic materials which are adapted to magnetically attract each other. Therefore, when the first surface 111 of the first plate 1 and the second surface 211 of the second plate 2 are adjacent to overlap, the first limiting elements 51 and the second limiting elements 52 are attracted or engaged with each other, so that the first plate 1 and the second plate 2 are relatively restricted at the folding position or the supporting position.

In other embodiments, the first limiting elements 51 and the second limiting elements 52 are not necessarily magnetic substances. Other components, which are able to restrict the first plate 1 and the second plate 2 in relative positions when the first surface 111 and the second surface 211 overlap, would be acceptable, such as hooks.

Figure 5:
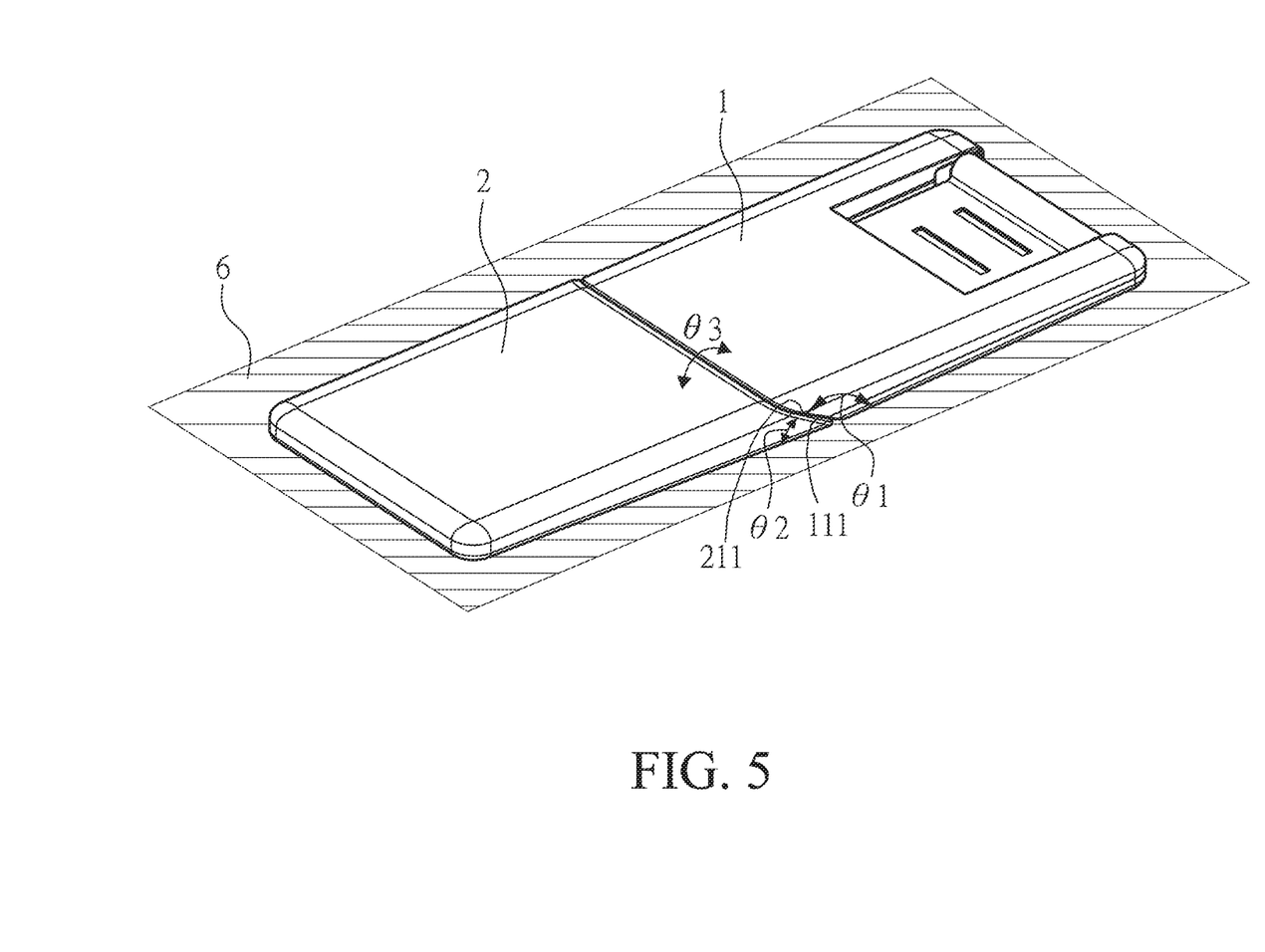
FIG. 5 is a perspective view showing the foldable supporting device of the present invention at the folding position.

Specifically, the first plate 1 and the second plate 2 of the foldable supporting device 1000 at the folding position are shown in FIG. 5, wherein the first plate 1 and the second plate 2 extend along a first plane 6. For the illustration, a first interior angle $\theta 1$ is formed between the first surface 111 and the first plane 6, and a second interior angle $\theta 2$ is formed between the second surface 211 and the first plane 6. The first interior angle $\theta 1$ and the second interior angle $\theta 2$ are complementary to each other, that is, $\theta 1 + \theta 2 = 180°$, and the first interior angle $\theta 1$ is greater than the second interior angle $\theta 2$. In the embodiment, the first interior angle $\theta 1$ approximates 150 degrees, and the second interior angle $\theta 2$ approximates 30 degrees. Simultaneously, the first plate 1 and the second plate 2 form a first angle $\theta 3$, which is $\theta 1 + \theta 2$ and is substantially equal to 180 degrees. In other embodiments, the first interior angle $\theta 1$ and the second interior angle $\theta 2$ are adjustable according to the user's requirement of the view angle under the condition of the first interior angle θ1 and the second interior angle θ2 being complementary and not equal to 90 degrees or 0 degrees.

Figure 6:
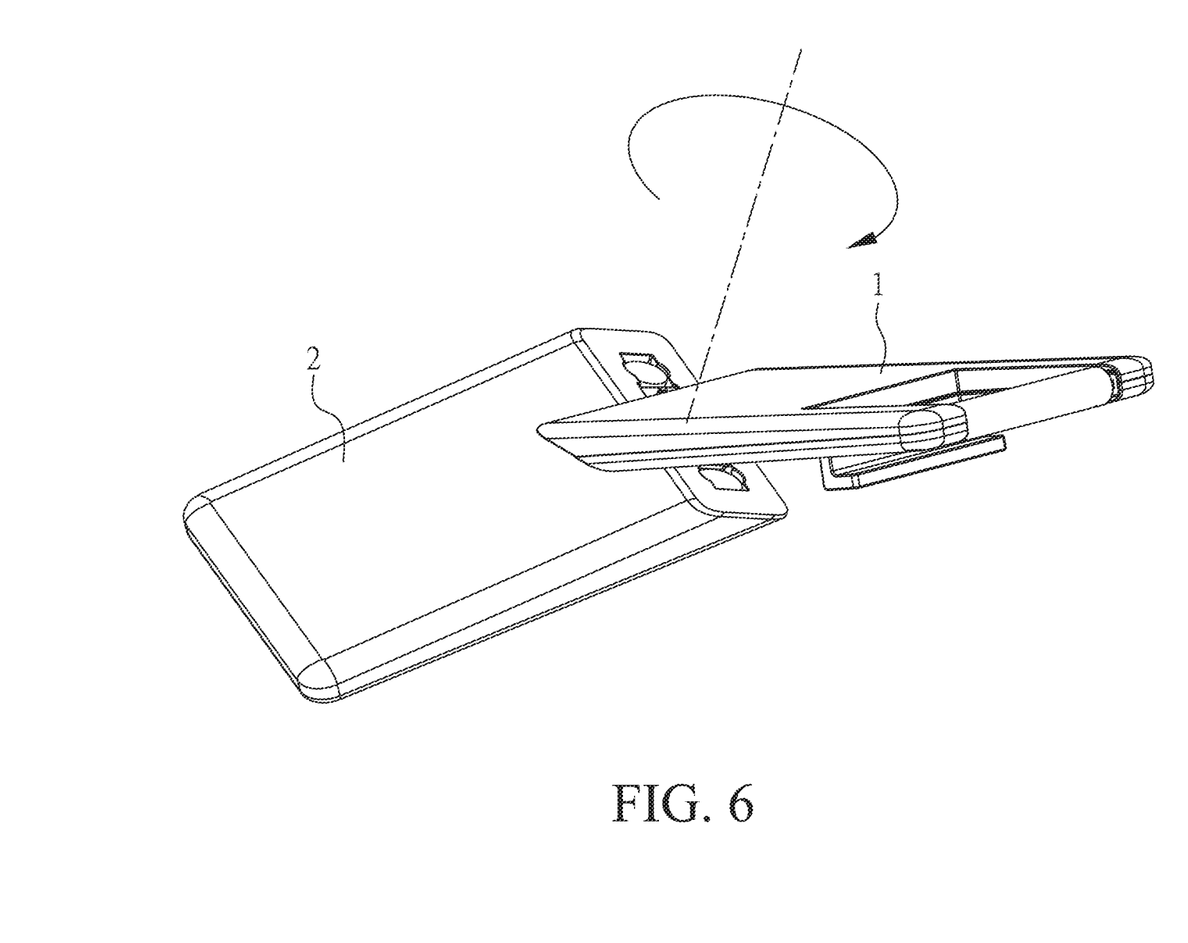
FIG. 6 is a perspective view showing the first plate and the second plate rotating with respect to each other.
Figure 7:
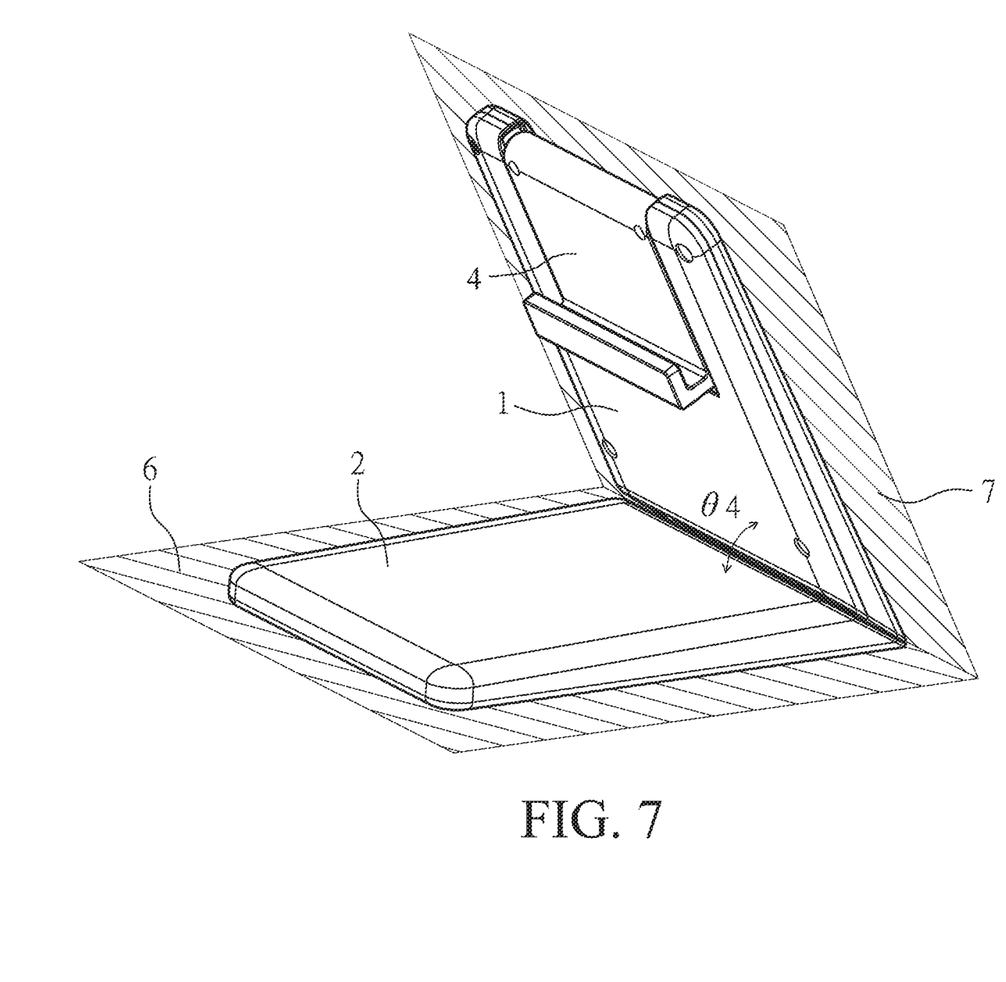
FIG. 7 is a perspective view showing the foldable supporting device of the present invention at the supporting position.

As shown in FIG. 7, when an external force is applied to rotate the first plate 1 and/or the second plate 2 and overcome the magnetic attraction between the first limiting elements 51 and the second limiting elements 52, the first plate 1 and the second plate 2 are transformed from the folding position to the supporting position. That is, as shown in FIG. 6, the first plate 1 and the second plate 2 are rotated with respect to each other by the rotating module 3. When the first plate 1 and the second plate 2 are rotated 180 degrees, they are transformed to the supporting position shown in FIG. 7, and the first limiting elements 51 and the second limiting elements 52 are magnetically attracted to each other to restrict themselves in positions. At this time, the first plate 1 extends along a second plane 7 and the second plate 2 still extends along the first plane 6 when the foldable supporting device 1000 is placed on the working surface. Accordingly, the first plane 6 and the working surface are overlapped. The first plate 1 and the second plate 2 form a second angle θ4 therebetween, and the second angle θ4 approximates 60 degrees (that is, approximates twice θ2). The supporting element 4 is then pivoted with respect to the first plate 1 to expand, for supporting the display 2000 as shown in FIG. 1. In other embodiments, the second angle θ4 is adjustable according to the requirements of design under the conditions of being approximately equal to twice θ2, preferably 15 degrees to 75 degrees, which is not limited.

In summary, the foldable supporting device of the present invention can be simply transformed between the folding position and the supporting position. When the foldable supporting device is at the folding position, it is flat and is conveniently carried or stored. When the foldable supporting device is prepared to support a display, the user can simply rotate the first plate and/or the second plate with respect to each other and transform them to the supporting position. Particularly for supporting a display with a touch panel, the foldable supporting device is adapted to fix the view angle and facilitate the operation.

What is claimed is:

1. A foldable supporting device for supporting a display, the foldable supporting device comprising:
   a first plate, including a first contact end, wherein the first contact end has a first surface and a first groove;
   a second plate, including a second contact end contacting with the first contact end, wherein the second contact end has a second surface and a second groove;
   a rotating module, being disposed between the first contact end and the second contact end for the first plate and the second plate being rotatable with respect to each other; and
   a supporting element, disposed on the first plate for supporting the display;
   wherein the first plate and the second plate are able to transform between a folding position and a supporting position, wherein the first plate and the second plate form a first angle at the folding position, and form a second angle at the supporting position, wherein the first angle is larger than the second angle, and wherein the first surface and the second surface contact with each other at both the folding position and the supporting position, and the rotating module is disposed in the first groove and the second groove.

2. The foldable supporting device as claimed in claim 1, wherein the first angle is substantially 180 degrees, and the second angle is from 15 degrees to 75 degrees.

3. The foldable supporting device as claimed in claim 2, wherein the rotating module has a first sheet, a second sheet, and a rotating shaft, wherein the first sheet is disposed in the first groove, the second sheet is disposed in the second groove, and the rotating shaft passes through the first sheet and the second sheet so that the first sheet and the second sheet are able to rotate with respect to each other.

4. The foldable supporting device as claimed in claim 3, wherein the rotating shaft has an axis perpendicular to the first surface and the second surface.

5. The foldable supporting device as claimed in claim 1, wherein the first plate further comprises a free end, and the supporting element comprises a bending portion, at least one pivot shaft, and a supporting plate, wherein the pivot shaft is pivotally connected to the free end, the supporting plate is connected to the pivot shaft, and the bending portion is formed at one end of the supporting plate for supporting the display.

6. The foldable supporting device as claimed in claim 5, wherein the supporting element has at least one magnet, and the display is correspondingly disposed with at least one magnet, when the display is placed on the supporting element, the magnets fix the display to the supporting element.

7. The foldable supporting device as claimed in claim 3, further comprising a limiting module disposed at the first contact end or the second contact end, wherein the limiting module restricts the first plate and the second plate in positions when the first plate and the second plate are at the folding position or the supporting position.

8. The foldable supporting device as claimed in claim 7, wherein the limiting module comprises two first limiting elements and two second limiting elements, the first contact end further comprises two first accommodating grooves, and the second contact end further comprises two second accommodating grooves, wherein the first limiting elements are disposed in the first accommodating grooves, and the second limiting elements are disposed in the second accommodating grooves, wherein the first limiting elements and the second limiting elements correspondingly engaged with each other when the first plate and the second plate are at the folding position or the supporting position.

9. The foldable supporting device as claimed in claim 8, wherein the first limiting elements and the second limiting elements are made of magnetic materials, and the first limiting elements and the second limiting elements are magnetically attracted to each other.

* * * * *